United States Patent [19]

Paavila

[11] Patent Number: 4,781,518
[45] Date of Patent: Nov. 1, 1988

[54] TREE GRIPPING DEVICE

[75] Inventor: Jack W. Paavila, Green Valley, Canada

[73] Assignee: Equipements Denis Inc., Ste. Hyacinthe, Canada

[21] Appl. No.: 155,278

[22] Filed: Feb. 12, 1988

[51] Int. Cl.$^4$ .............................................. B66C 3/00
[52] U.S. Cl. ............................ 414/724; 37/DIG. 3; 37/DIG. 12; 37/117.5; 172/777; 294/104; 414/912; 414/740
[58] Field of Search ............... 414/724, 740, 912, 722; 37/DIG. 3, DIG. 12, 117.5, 2 R; 172/438, 701.1, 777, 811, 815, 245, 247; 294/104

[56] References Cited

U.S. PATENT DOCUMENTS

| | | | |
|---|---|---|---|
| 3,273,729 | 9/1966 | Holopainen | 414/694 |
| 4,403,906 | 9/1983 | Holopainen | 414/912 X |
| 4,645,410 | 2/1987 | Royer | 37/DIG. 12 X |

Primary Examiner—Robert J. Spar
Assistant Examiner—Donald W. Underwood

[57] ABSTRACT

A tree gripping device adapted to be mounted on the top of a bulldozer blade. The device has a base member mounted on top of the blade, the base member projecting past one side of the blade. A gripping arm is pivotally mounted on the projecting portion of the base member, the arm extending along the side of the blade. Actuating structures move the gripping arm toward the side of the blade to grip a tree between them.

5 Claims, 2 Drawing Sheets

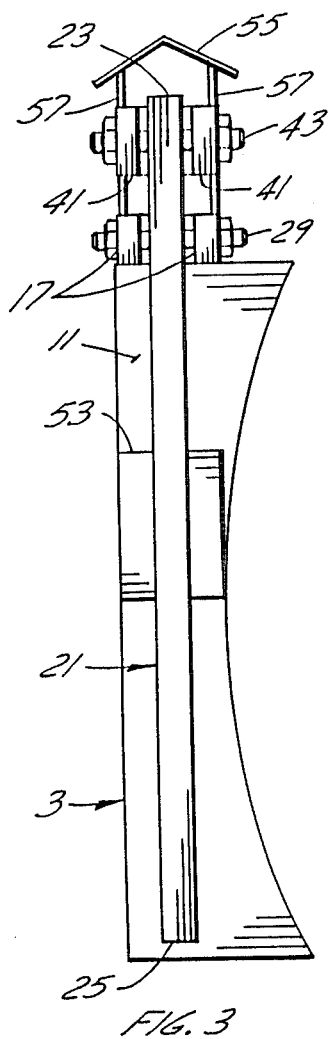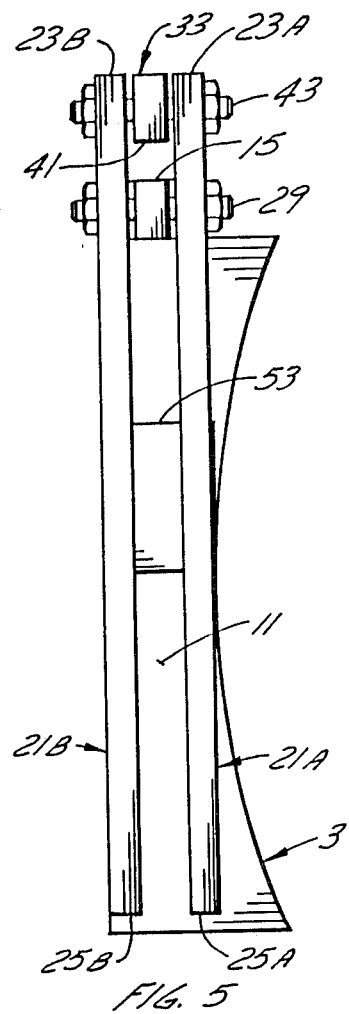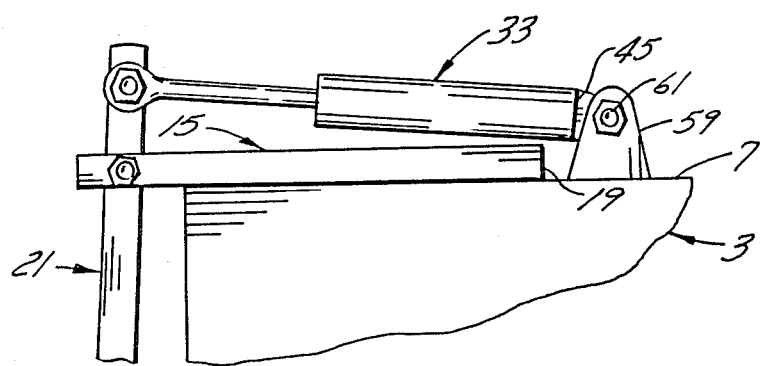

TREE GRIPPING DEVICE

BACKGROUND OF THE INVENTION

1. Field of the Invention

The invention is directed toward an improved tree gripping device.

The tree gripping device is specifically designed to be mounted on a bulldozer blade so that the bulldozer can be used to transport trees.

2. Description of the Prior Art

In harvesting trees in a forest, the trees are felled, possibly delimbed at the felling site, and then transported from the felling site for further processing. The trees are often transported by dragging bundles of the trees, by their butt ends. Often one or more trees drop out of the bundle as they are being dragged. The cost of retrieving these dropped trees, using existing forestry equipment, is quite expensive and usually the trees are left lying on the ground where they drop.

In many tree harvesting operations, bulldozers are employed to collect the cut-off limbs, to build roads, and to perform other tasks. It is known to provide a tree gripping device on the side of the blade on the bulldozer so that the bulldozer can be used to collect any trees that drop during transport of the trees. A bulldozer equipped with such a tree gripping device can economically collect the dropped trees one or two at a time thereby improving profitability.

U.S. Pat. No. 4,645,410 discloses a bulldozer with a blademounted tree gripping device. The gripping device operates satisfactorily. However, it does have some disadvantages. The hydraulic actuator, which operates the gripping device, is located in a relatively exposed position on the side of the blade and it, and the line connections to it, can be easily damaged during normal operation of the bulldozer. Also, the gripping device employs both a fixed jaw and a movable jaw, which makes the device expensive.

SUMMARY OF THE INVENTION

It is the purpose of the present invention to provide a tree gripping device adapted to be mounted on a bulldozer blade which is simpler and cheaper to construct than the known gripping device, and which also is constructed to locate the actuator means in a more protective position on the blade. In accordance with the present invention, the gripping device has the actuating means located on the top of the bulldozer blade where it is more protected during normal use of the bulldozer. Cover means can be mounted on the bulldozer blade, overlying the actuator means, to further protect it. Also in accordance with the present invention, the gripping device is provided with a single movable jaw. The single jaw cooperates with the side of the blade to grip a tree between them. Eliminating the fixed jaw simplifies the gripping device making it cheaper to manufacture.

The invention is particularly directed toward a tree gripping device adapted to be mounted on the top of a bulldozer blade. The device comprises an elongate base member for attachment in a generally horizontal position on the top of, and aligned with, the bulldozer blade with one end of the base member projecting past one side of the blade. A gripping arm is pivotally attached near one of its ends to the base member adjacent its one end. The gripping arm extends generally transverse to the base member and is located adjacent the one side of the blade with its other free end near the ground when the base member is mounted on top of the bulldozer blade.

Actuating means, generally overlying the base member, are pivotally attached adjacent one end to the gripping arm adjacent its one end and adjacent its other end to one of the base member and the top of the bulldozer blade. The actuating means operates to move the gripping arm to grip a tree lying on the ground between the gripping arm adjacent its free end and the said one side of the bulldozer blade.

BRIEF DESCRIPTION OF THE DRAWINGS

FIG. 3 is a side detail view of the gripping device;

FIG. 4 is a front detail view of another embodiment of the gripping device; and

FIG. 5 is a side detail view of another embodiment of the gripping device.

DESCRIPTION OF THE PREFERRED EMBODIMENTS

Figure 1:
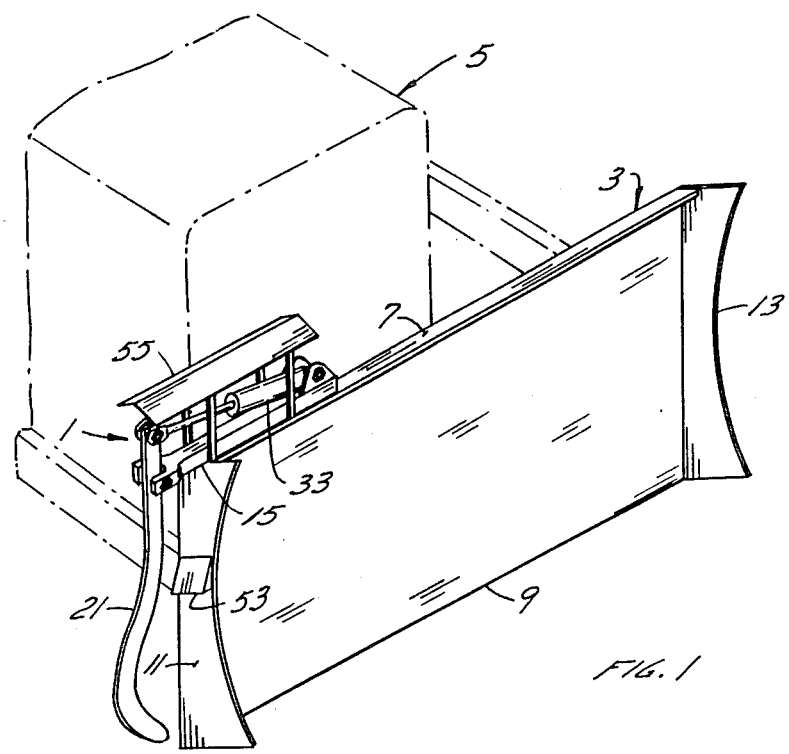
FIG. 1 is a perspective view of the tree gripping device mounted on a bulldozer blade.
Figure 2:
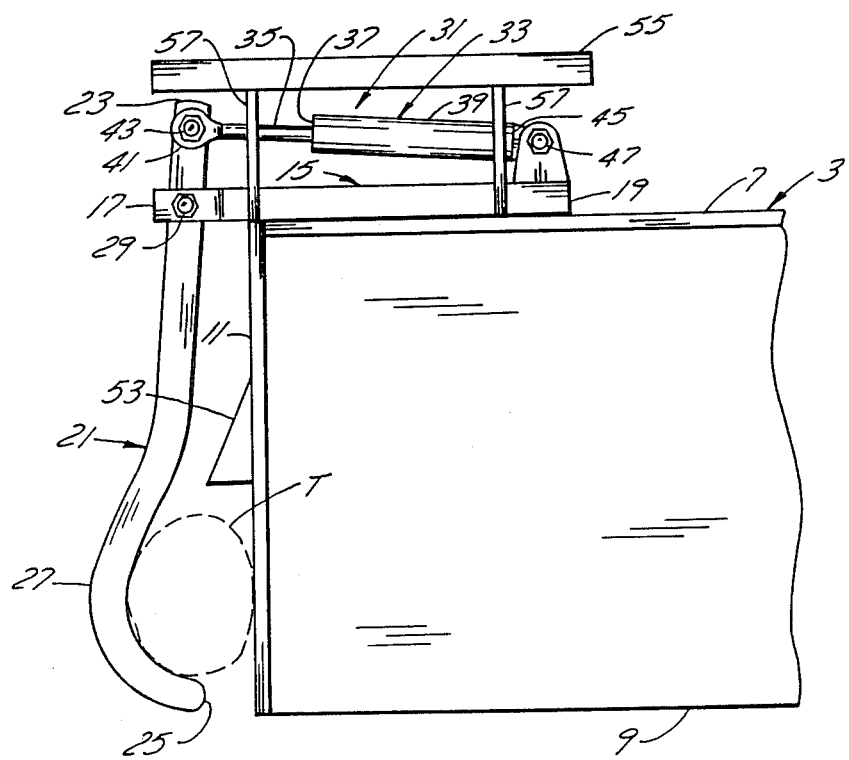
FIG. 2 is a front detail view of the gripping device.

The tree gripping device 1 of the present invention, as shown in FIGS. 1 to 3, is adapted to be mounted on the blade 3 of a bulldozer 5. The blade has top and bottom sides 7, 9 and end sides 11, 13. The tree gripping device 1 is mounted on the top side 7 of the blade 3.

The tree gripping device 1 has an elongate base member 15 having a first end 17 and a second end 19. The gripping device 1 also has a tree gripping arm 21 having a first end 23 and a second end 25. The arm 21 has a hook shaped portion 27 near its second end 25. The gripping arm 21 is pivotally connected, near its first end 23, to the base member 15 adjacent its first end 17, by a pivot member 29. The gripping arm 21 extends generally transverse to the base member 15.

The gripping device 1 also has actuating means 31 for pivoting the gripping arm 21 relative to the base member 15 about pivot member 29. The actuating means 31 preferably comprises a hydraulic actuator 33 having a piston rod 35 projecting from one end 37 of a cylinder 39. One end of the actuator 33, the free end 41 of the piston rod 35 for example, is pivotally connected adjacent the first end 23 of the tree gripping arm 21 by a pivot member 43. The other end of the actuator 33, the other end 45 of cylinder 39 for example, is pivotally connected to the base member 15 adjacent its second end 19 by a pivot member 47. The actuator 33 generally overlies the base member 15 and is positioned relatively close to the top surface 49 of the base member.

The gripping device 1 is mounted on the top side 7 of the blade 3 at one end side 11. The base member 15 is mounted on the top side 7 of the blade 3, parallel with the blade, with its first end 17 projecting just past the one end side 11. The base member 15 can be welded or otherwise suitably fixed to the blade 3. The gripping arm 21 extends downwardly from the base member 15 adjacent the one end side 11 of the blade 3. The second, free end 25 of the gripping arm 21 is close to the ground when the device 1 is mounted on the blade.

In the operative position, the free end 25 of the gripping arm 21 is normally positioned close to the end side 11 of the blade 3. When it is desired to pick up a tree lying on the ground with the bulldozer, the bulldozer is maneuvered to place the blade 3 above the butt end of the tree with the gripping arm 21 directly over the tree.

The actuator 33 is operated to move the free end 25 of the gripping arm 21 away from the blade 3 and the blade 3 is then lowered to place the tree butt end "T" between the gripping arm 21 and the blade 3. The actuator 33 is again operated to move the free end 25 of gripping arm 21 toward the blade 3 to pin the butt end between the gripping arm 21, in its hook-shaped portion 27, and the blade side 11. The bulldozer blade 3 can now be raised, and the bulldozer operated to move the tree.

If desired, a stop member 53 can be mounted on the one end side 11 of the blade 3 about midway between its top and bottom sides 7, 9 as shown in FIGS. 2 and 3. The stop member 53 extends laterally from the blade 3 and prevents the butt end of the tree from riding up the one side 11 of the blade as the gripping arm 21 is moved toward the blade 3 to grip the tree.

A protective cover 55, as shown in FIGS. 2 and 3, supported at its ends by legs 57 can be mounted on the blade 3 over the actuator 33 to protect it.

While the other end 45 of the actuator 33 has been shown as being mounted on the base member 15, the other end 45 of the actuator can also be mounted directly on the top side 7 of the blade 3 via brackets 59 fixed thereon, and via a pivot member 61 as shown in FIG. 4. This can permit the use of a shorter base member 15.

The gripping device 1 has been shown with a single gripping arm 21. It could also employ twin gripping arms, one on each side of the blade. As shown in FIG. 5 two gripping arms 21A, 21B are mounted, one on either side of member 15, by pivot member 29. The first ends 23A, 23B of the gripping arms 21A, 21B are joined by pivot member 43. The one end 41 of the actuator 33 is pivotally mounted on pivot member 43 between the first ends 23A, 23B of the gripping arms 21A, 21B. Operation of actuator 33 will move the gripping arms 21A, 21B to securely grip a tree between the arms and the blade 3. If desired, the side 11 of the blade 3 can be notched or otherwise cut away to allow the free ends 25A, 25B of the gripping arms 21A, 21B to pass past the side 11 of the blade.

I claim:

1. A tree gripping device adapted to be mounted on the top of a bulldozer blade, comprising: an elongate base member for attachment in a generally horizontal position on the top of, and aligned with, the bulldozer blade with one end of the base member projecting past one side of the blade; a gripping arm pivotally attached near one of its ends to he base member adjacent its one end, the gripping arm extending generally transverse to the base member and located adjacent the one side of the blade with its other free end near the ground when the base member is mounted on the top of the bulldozer blade; and actuating means, generally overlying the base member and pivotally attached adjacent one end to the gripping arm adjacent its one end and adjacent its other end to one of the base member and the top of the bulldozer blade; the actuating means operable to move the gripping arm to grip a tree lying on the ground between the gripping arm, adjacent its free end, and the said one side of the bulldozer blade.

2. A tree gripping device as claimed in claim 1 wherein the actuating means is pivotally attached at its other end to the other end of the base member.

3. A tree gripping device as claimed in claim 1 including stop means mounted on the one side of the bulldozer blade to prevent the gripped tree from riding up the side of the blade.

4. A tree gripping device as claimed in claim 1 including a cover mounted on top of the bulldozer blade to overlie and protect the actuating means.

5. A tree gripping device adapted to be mounted on the top of a bulldozer blade, comprising: an elongate base member for attachment in a generally horizontal position on the top of, and aligned with, the bulldozer blade with one end of the base member projecting past one side of the blade; a pair of gripping arms, each pivotally attached near one of its ends to the base member adjacent its one end, the gripping arms, on opposite sides of the base member, extending generally transverse to the base member and located adjacent the one side of the blade with their other free ends near the ground when the base member is mounted on the top of the bulldozer blade; and actuating means, generally overlying the base member and pivotally attached adjacent one end to the gripping arms adjacent their one end and adjacent its other end to one of the base member and the top of the bulldozer blade; the actuating means operable to move the gripping arms to grip a tree lying on the ground between the gripping arms, adjacent their free end, and the said one side of the bulldozer blade.

* * * * *